United States Patent
Kurisu et al.

(10) Patent No.: US 12,065,572 B2
(45) Date of Patent: Aug. 20, 2024

(54) CARBON BLACK, METHOD FOR PRODUCING CARBON BLACK, AND RUBBER COMPOSITION

(71) Applicant: TOKAI CARBON CO., LTD., Tokyo (JP)

(72) Inventors: Kengo Kurisu, Tokyo (JP); Takuya Takahashi, Tokyo (JP); Yuki Akiyama, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 539 days.

(21) Appl. No.: 17/602,551

(22) PCT Filed: Mar. 26, 2020

(86) PCT No.: PCT/JP2020/013627
§ 371 (c)(1),
(2) Date: Oct. 8, 2021

(87) PCT Pub. No.: WO2020/209082
PCT Pub. Date: Oct. 15, 2020

(65) Prior Publication Data
US 2022/0195200 A1    Jun. 23, 2022

(30) Foreign Application Priority Data
Apr. 12, 2019   (JP) ................. 2019-076243

(51) Int. Cl.
*C09C 1/50*    (2006.01)
*B60C 1/00*    (2006.01)
*C08L 7/00*    (2006.01)

(52) U.S. Cl.
CPC ............. *C09C 1/50* (2013.01); *C08L 7/00* (2013.01); *B60C 1/0016* (2013.01);
(Continued)

(58) Field of Classification Search
CPC .... C09C 1/50; C09C 1/44; C09C 1/46; C09C 1/48; C09C 1/482; C09C 1/485;
(Continued)

(56) References Cited

FOREIGN PATENT DOCUMENTS

| JP | 64-4659 A | 1/1989 |
| JP | 4-108837 A | 4/1992 |

(Continued)

OTHER PUBLICATIONS

English Translation of Written Opinion of the International Searching Authority in PCT/JP2020/013627 (Year: 2020).*

(Continued)

*Primary Examiner* — Daniel C. McCracken
(74) *Attorney, Agent, or Firm* — WHDA, LLP

(57) ABSTRACT

A carbon black is disclosed which can exert excellent abrasion resistance while suppressing heat generation when incorporated into a rubber composition. A carbon black in which the total number of active sites represented by a product of a full width at half maximum of a Raman scattering peak appearing in a range of 1340 to 1360 $cm^{-1}$ when an excitation wavelength is 532 nm and a specific surface area when nitrogen gas is adsorbed is $3.60 \times 10^4$ to $8.20 \times 10^4$ ($cm^{-1} \cdot m^2/g$), and when a nuclear magnetic resonance signal of a spin-spin relaxation process observed by a solid echo method is represented by a sum of a first signal and a second signal having a time constant larger than that of the first signal, an amount of hydrogen represented by a signal intensity per unit mass at time 0 of the first signal is 50.0 to 250.0 (/g).

4 Claims, 3 Drawing Sheets

(52) U.S. Cl.
CPC ...... *C01P 2002/82* (2013.01); *C01P 2004/53* (2013.01); *C01P 2006/12* (2013.01)

(58) Field of Classification Search
CPC .. C09C 1/487; C09C 1/52; C09C 1/54; C09C 1/56; C09C 1/565; C09C 1/58; C09C 1/60; C08L 7/00; C08L 21/00; B60C 1/0016; C01P 2002/82; C01P 2004/53; C01P 2006/12; C01P 2004/51; C01P 2006/42; Y02T 10/86; C08K 3/04
USPC .......... 423/449.1–449.9, 450, 452, 453, 454, 423/455, 456, 457, 458, 459
See application file for complete search history.

(56) References Cited

FOREIGN PATENT DOCUMENTS

| | | |
|---|---|---|
| JP | 10-36703 A | 2/1998 |
| JP | 2002-146097 A | 5/2002 |
| JP | 2003-261795 A | 9/2003 |
| JP | 2003-292821 A | 10/2003 |
| JP | 2005-8877 A | 1/2005 |
| JP | 2007-112879 A | 5/2007 |
| JP | 2017-8223 A | 1/2017 |

OTHER PUBLICATIONS

International Search Report dated Jun. 23, 2020 issued in counterpart International Application No. PCT/JP2020/013627, with English Translation. (6 pages).

* cited by examiner

[Figure 1]
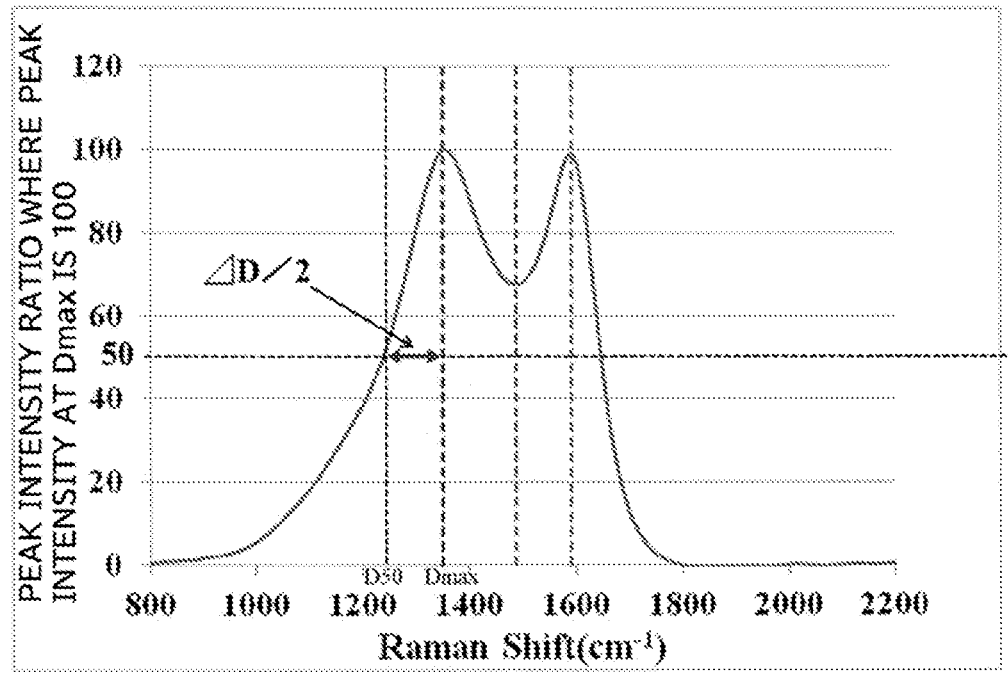
[Figure 2]
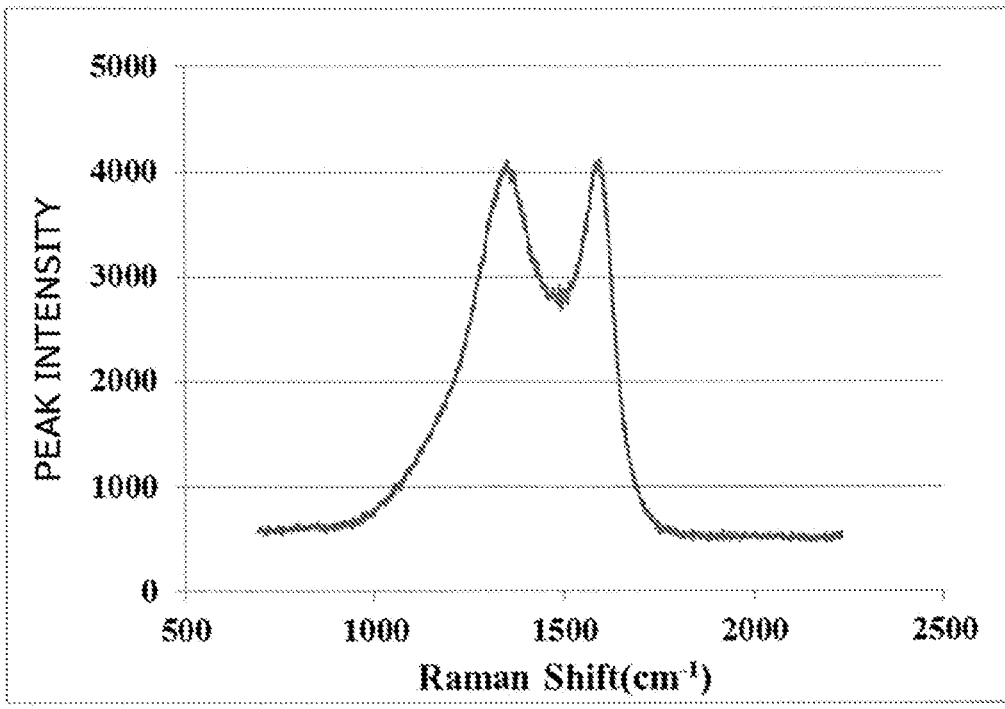

[Figure 3]

SIGNAL INTENSITY [a.u.]
∝ MAGNETIZATION IN
y-AXIS DIRECTION

⟶ TIME t [ms]

[Figure 4]

SIGNAL INTENSITY

A(1) ∝ AMOUNT OF HYDROGEN ATOM

A(2)

$$f(t) = A(1)exp\left[-\frac{t}{T2(1)}\right] + A(2)exp\left[-\frac{t}{T2(2)}\right]$$

⟶ TIME t [ms]

[Figure 5]
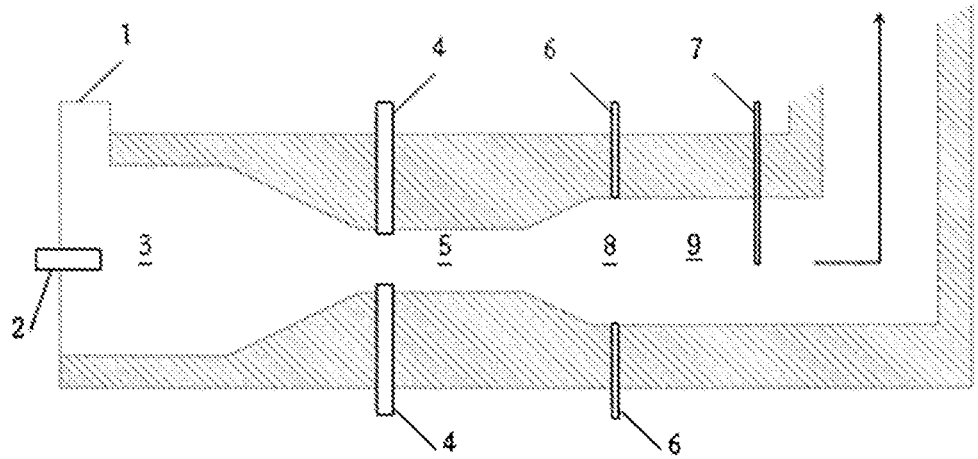
[Figure 6]
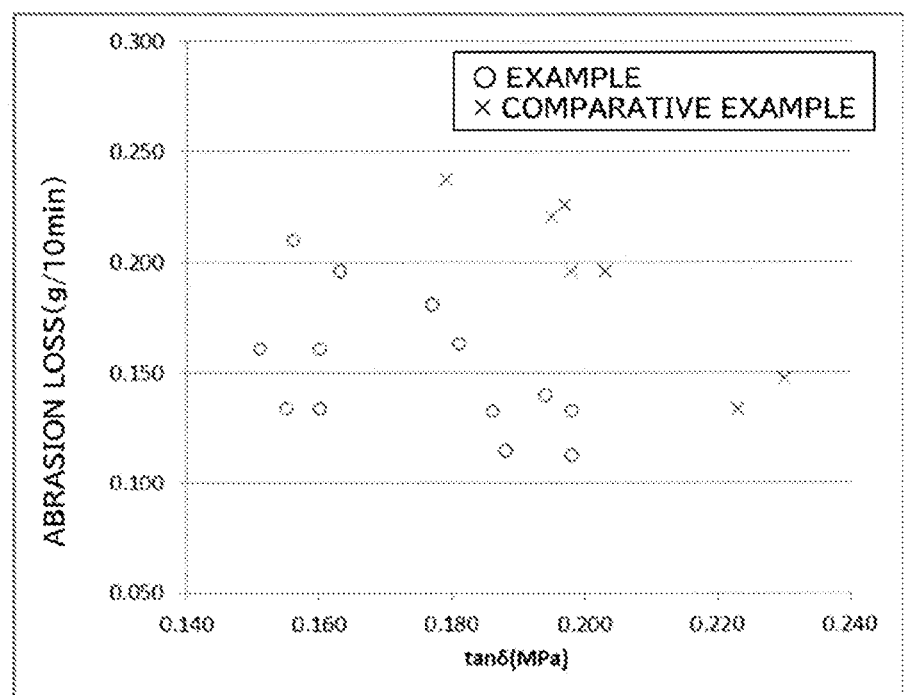

CARBON BLACK, METHOD FOR PRODUCING CARBON BLACK, AND RUBBER COMPOSITION

TECHNICAL FIELD

The present invention relates to a carbon black, a method for producing the carbon black, and a rubber composition.

BACKGROUND ART

There are a variety of types of carbon black for rubber reinforcement depending on characteristics, and these characteristics are key factors for determining various performances of rubbers. Thus, when carbon black is incorporated into rubber compositions, a carbon black having properties that are matched to member applications is selected.

For example, for rubber members which require high reinforcing properties such as tire tread parts, hard carbon black having a small primary particle size, a large specific surface area, and a high structure, such as SAF (N110) and ISAF (N220), is conventionally used.

Among such rubber members for tire tread parts, a carbon black which has a CTAB specific surface area and a 24M4 DBP absorption within a specific range, and in which the 24M4 DBP absorption and the aggregate density of the carbon black are in a specific relation has been suggested as a rubber member for tire tread in which steering stability and abrasion resistance are improved for high-performance cars and racing cars (see Patent Literature 1 (Japanese Patent Laid-Open No. 2005-8877)).

CITATION LIST

Patent Literature

[Patent Literature 1] Japanese Patent Laid-Open No. 2005-8877

SUMMARY OF INVENTION

Technical Problem

In recent years, the development of fuel efficient tires is strongly desired under demand for energy saving, and the development of a rubber composition for fuel efficient tires in which heat generation properties are suppressed is desired. However, there has been a technical problem in that heat generation characteristics are likely to be increased in general, when a rubber member having improved reinforcing properties and abrasion resistance as described above is used in the tire tread part.

On the other hand, since heavy vehicles such as buses and trucks generally have a large vehicle weight and a long running distance, the load on the tire tread part is heavy, and therefore, a carbon black which can further improve the abrasion resistance when incorporated into a rubber composition for tire tread parts has been demanded.

Under such circumstances, the objects of the present invention are to provide a new carbon black which can exert superior abrasion resistance while suppressing heat generation when incorporated into a rubber composition such as a tire tread rubber composition, and further provide a method for producing the carbon black, and a rubber composition.

Solution to Problem

The present inventors have intensively studied to solve the above problems and, as a result, found that a carbon black in which a total number of active sites represented by a product of a full width at half maximum of a Raman scattering peak appearing in a range of 1340 to 1360 $cm^{-1}$ when an excitation wavelength is 532 nm and a specific surface area when nitrogen gas is adsorbed falls within a predetermined range, and when a nuclear magnetic resonance signal of a spin-spin relaxation process observed by a solid echo method is represented by a sum of a first signal and a second signal having a time constant larger than that of the first signal, an amount of hydrogen represented by a signal intensity per unit mass at time 0 of the first signal falls within a predetermined range can solve the above technical problems, thereby completing the present invention based on this finding.

That is, the present invention provides:

(1) a carbon black, wherein a total number of active sites represented by a product of a full width at half maximum of a Raman scattering peak appearing in a range of 1340 to 1360 $cm^{-1}$ when an excitation wavelength is 532 nm and a specific surface area when nitrogen gas is adsorbed is $3.60 \times 10^4$ to $8.20 \times 10^4$ ($cm^{-1} \cdot m^2/g$), and when a nuclear magnetic resonance signal of a spin-spin relaxation process observed by a solid echo method is represented by a sum of a first signal and a second signal having a time constant larger than that of the first signal, an amount of hydrogen represented by a signal intensity per unit mass at time 0 of the first signal is 50.0 to 250.0 (/g);

(2) a method for producing the carbon black according to the above (1), comprising sequentially performing:

a primary reaction step of bringing a raw material oil having a ratio of the mass of carbon to the mass of hydrogen of 10.0 to 20.0 into contact with a combustion gas to generate a primary reactant, and a secondary reaction step of reacting an additive oil having a ratio of the mass of carbon to the mass of hydrogen of 5.0 or more and less than 10.0 in an amount of 0.20 to 1.00 times the mass of the raw material oil with the primary reactant;

(3) the method for producing the carbon black according to the above (2) using a reactor sequentially including a fuel combustion zone, a raw material introduction zone, and an additive oil introduction zone, from the upstream to the downstream direction in a gas flow path, the method comprising:

introducing, mixing, and combusting an oxygen containing gas and a fuel in the fuel combustion zone to generate a high temperature combustion gas flow, and introducing the raw material oil into the raw material introduction zone while introducing the high temperature combustion gas flow to generate the primary reactant, as the primary reaction step, and then introducing the additive oil into the additive oil introduction zone, as the secondary reaction step; and (4) a rubber composition comprising 20 to 150 parts by mass of the carbon black according to the above (1) with respect to 100 parts by mass of a rubber component.

Advantageous Effects of Invention

The present invention can provide a new carbon black which can exert superior abrasion resistance while suppressing heat generation when incorporated into a rubber composition such as a tire tread rubber composition, and further provide a method for producing the carbon black, and a rubber composition.

BRIEF DESCRIPTION OF DRAWINGS

FIG. 1 is a graph illustrating a method for calculating the full width at half maximum in the carbon black according to the present invention.

FIG. 2 is a graph for illustrating the method for measuring a Raman spectrum in the carbon black according to the present invention.

FIG. 3 is a graph illustrating an example of the $T_2$ relaxation curve (free induction decay curve) obtained by measurement of spin-spin relaxation times $T_2$ using a pulsed nuclear magnetic resonance apparatus in the carbon black according to the present invention.

FIG. 4 is a graph illustrating the fitting curves of the $T_2$ relaxation curve (free induction decay curve) illustrated in FIG. 3.

FIG. 5 is a schematic cross sectional view illustrating an example of the form of the reactor used in the production of the carbon black according to the present invention.

FIG. 6 is a graph illustrating the relation of the abrasion loss with respect to the loss factor (tan δ) of each carbon black obtained in Examples and Comparative Examples of the present invention.

DESCRIPTION OF EMBODIMENTS

First, the carbon black according to the present invention will be described.

The carbon black according to the present invention is a carbon black in which a total number of active sites represented by a product of a full width at half maximum of a Raman scattering peak appearing in a range of 1340 to 1360 $cm^{-1}$ when an excitation wavelength is 532 nm and a specific surface area when nitrogen gas is adsorbed is $3.60 \times 10^4$ to $8.20 \times 10^4$ ($cm^{-1} \cdot m^2/g$), and when a nuclear magnetic resonance signal of a spin-spin relaxation process observed by a solid echo method is represented by a sum of a first signal and a second signal having a time constant larger than that of the first signal, an amount of hydrogen represented by a signal intensity per unit mass at time 0 of the first signal is 50.0 to 250.0 (/g).

More specifically, the carbon black according to the present invention is a carbon black in which the total number of active sites represented by the following formula (I):

$$\Delta D \times N_2 SA \quad (I)$$

(wherein ΔD is a full width at half maximum ($cm^{-1}$) of a peak having a peak top within a range of 1350±10 $cm^{-1}$ in a Raman spectrum obtained by measurement using a laser Raman spectrometer at an excitation wavelength of 532 nm, and $N_2SA$ is a nitrogen adsorption specific surface area ($m^2/g$) measured by a nitrogen adsorption method) is 3.60× $10^4$ to $8.20 \times 10^4$ ($cm^{-1} \cdot m^2/g$), and when a $T_2$ relaxation curve (free induction decay curve) obtained by measurement of spin-spin relaxation times $T_2$ by a solid echo method with $^1H$ as an observation nucleus using a pulsed nuclear magnetic resonance apparatus is represented by the following formula f(t):

$$f(t)=A(1)\exp(-t/T_2(1))+A(2)\exp(-t/T_2(2))$$

(wherein $T_2(1)$ is a relaxation time of a component having a short relaxation time, $T_2(2)$ is a relaxation time of a component having a long relaxation time, A(1) is a signal intensity at t=0 of the component having a short relaxation time, and A(2) is a signal intensity at t=0 of the component having a long relaxation time), the amount of hydrogen represented by the following formula (II):

$$A(1)/w \quad (II)$$

(wherein w is a mass (g) of a measurement sample) is 50.0 to 250.0 (/g).

In the carbon black according to the present invention, the full width at half maximum (full width at half maximum ΔD) refers to the full width at half maximum ($cm^{-1}$) of a peak having a peak top within a range of 1340 to 1360 $cm^{-1}$ (1350±10 $cm^{-1}$) in a Raman spectrum obtained by measurement using a laser Raman spectrometer at an excitation wavelength of 532 nm.

The full width at half maximum (full width at half maximum ΔD) is preferably 200 to 330 $cm^{-1}$ from the viewpoint of ensuring moderate binding force (affinity) between a carbon black surface and rubber, more preferably 210 to 310 $cm^{-1}$ from the viewpoint of ensuring stable binding force (affinity), and further preferably 215 to 295 $cm^{-1}$ from the viewpoint of ensuring strong binding force (affinity).

In the carbon black according to the present invention, when the full width at half maximum (full width at half maximum ΔD) falls within the above range, the number of active sites on the carbon black surface can be controlled to the desired range, whereby the product of the full width at half maximum and the nitrogen adsorption specific surface area (ΔD×$N_2$SA) described below can be easily controlled within the desired range.

FIG. 1 is a graph showing a method for calculating the full width at half maximum (full width at half maximum ΔD) in the carbon black according to the present invention.

As shown in FIG. 1, for the carbon black according to the present invention, a peak having a peak top within a range of 1350±10 $cm^{-1}$ is detected in a Raman spectrum obtained by measurement by laser Raman spectroscopy at an excitation wavelength of 532 nm.

Then, when the measurement wavelength at the above peak top position is defined as D max ($cm^{-1}$) and, in the obtained spectrum, the detected position at the low wavelength (low Raman shift) side having a detected intensity that is half the peak intensity at the above D max is defined as D50 ($cm^{-1}$), a value calculated by the following formula is defined as the full width at half maximum ΔD ($cm^{-1}$) in the present application.

$$\Delta D=(D\max-D50)\times 2$$

In the above Raman spectrum, a peak having a peak top within a range of 1350±10 $cm^{-1}$ corresponds to a peak of D band in a Raman spectrum.

According to the investigation by the present inventors, the full width at half maximum ΔD of the above peak of D band represents the degree of disorder of the crystal structure on the carbon black surface. Therefore, in the present invention, ΔD within the desired range means that there are many edges on the carbon black surface, that is, many portions where functional groups exhibiting affinity with a rubber component (active sites) are formed.

In the present invention, the full width at half maximum ΔD ($cm^{-1}$) means a value calculated from a Raman spectrum obtained by measuring a sample under the following measurement conditions (1) and then subjecting the results to the data treatment (2).

(1) Using HR-800 manufactured by HORIBA, Ltd. as a laser Raman spectrometer, a few particles of a carbon black sample serving as a measurement object are placed on a slide glass and rubbed with a spatula several times to make the surface flat, which are measured under the following measurement conditions.

YAG laser (excitation wavelength): 532 nm
Number of lines: 600 gr/mm
Filter: D0.6
Objective lens magnification: 100×
Exposure time: 150 seconds
Cumulative number: two times An example of the spectrum obtained at this time is shown in FIG. 2.

(2) The signal intensity at a measurement wavelength (Raman Shift) of 2100 $cm^{-1}$ of the obtained spectrum is defined as 0, and among the data points constituting the spectrum, an average value is calculated for each adjacent 39 points, and then, the average values are smoothed to obtain a spectral curve connecting the above each average value. Then, for ease of comparison of each sample, the peak top observed within a measurement wavelength range of 1350±10 $cm^{-1}$ is defined as 100.

An example of the Raman spectrum obtained at this time is the Raman spectrum as illustrated in FIG. 1.

In the carbon black according to the present invention, the specific surface area when nitrogen gas is adsorbed means a nitrogen adsorption specific surface area $N_2SA$ ($m^2/g$) of the carbon black measured by a nitrogen adsorption method.

In the carbon black according to the present invention, the nitrogen adsorption specific surface area $N_2SA$ is preferably 110 to 410 $m^2/g$ from the viewpoint of ensuring moderate hardness (processability) of the rubber composition, more preferably 120 to 400 $m^2/g$ from the viewpoint of ensuring stable hardness (processability) of the rubber composition, and further preferably 125 to 395 $m^2/g$ from the viewpoint of ensuring the hardness (processability) of the rubber composition that is excellent in production efficiency.

In the carbon black according to the present invention, when the nitrogen adsorption specific surface area $N_2SA$ falls within the above range, moderate hardness (processability) of the rubber composition can be ensured and the number of active sites of the carbon black surface can be controlled to the desired range, whereby the product of the full width at half maximum and the nitrogen adsorption specific surface area ($\Delta D \times N_2SA$) described below can be easily controlled within the desired range.

In the present application, the nitrogen adsorption specific surface area $N_2SA$ means a value measured based on the amount of nitrogen adsorption in accordance with the method defined in JIS K6217-2 2001 "Testing methods of fundamental characteristics of carbon black for rubber industry".

The carbon black according to the present invention is a carbon black in which a total number of active sites represented by a product of a full width at half maximum of a Raman scattering peak appearing in a range of 1340 to 1360 $cm^{-1}$ when an excitation wavelength is 532 nm and a specific surface area when nitrogen gas is adsorbed is $3.60 \times 10^4$ to $8.20 \times 10^4$ ($cm^{-1} \cdot m^2/g$).

More specifically, the carbon black according to the present invention is a carbon black in which the total number of active sites represented by the following formula (I):

$$\Delta D \times N_2SA \quad (I)$$

(wherein $\Delta D$ is a full width at half maximum ($cm^{-1}$) of a peak having a peak top within a range of 1350±10 $cm^{-1}$ in a Raman spectrum obtained by measurement using a laser Raman spectrometer at an excitation wavelength of 532 nm, and $N_2SA$ is a nitrogen adsorption specific surface area ($m^2/g$) measured by a nitrogen adsorption method) is $3.60 \times 10^4$ to $8.20 \times 10^4$ ($cm^{-1} \cdot m^2/g$).

The above total number of active sites (the total number of active sites represented by the above formula (I)) is $3.60 \times 10^4$ to $8.20 \times 10^4$ ($cm^{-1} \cdot m^2/g$) to ensure moderate binding force (affinity) between the carbon black surface and rubber as well as moderate hardness (processability) of the rubber composition at the same time, preferably $3.70 \times 10^4$ to $7.20 \times 10^4$ ($cm^{-1} \cdot m^2/g$) to ensure stable affinity and processability at the same time, and more preferably $3.90 \times 10^4$ to $6.80 \times 10^4$ ($cm^{-1} \cdot m^2/g$) to ensure an optimum balance between the affinity and the processability.

In the carbon black according to the present invention, when the above total number of active sites (the total number of active sites represented by the above formula (I)) falls within the above range, moderate binding force (affinity) between the carbon black and a rubber component can be obtained, and moderate hardness (processability) of the rubber composition can be easily achieved upon use as a rubber component.

The carbon black according to the present invention is a carbon black in which, when a nuclear magnetic resonance signal of a spin-spin relaxation process observed by a solid echo method is represented by a sum of a first signal and a second signal having a time constant larger than that of the first signal, an amount of hydrogen represented by a signal intensity per unit mass at time 0 of the first signal is 50.0 to 250.0 (/g).

More specifically, the carbon black according to the present invention is a carbon black in which, when a $T_2$ relaxation curve (free induction decay curve) obtained by measurement of spin-spin relaxation times $T_2$ by a solid echo method with $^1H$ as an observation nucleus using a pulsed nuclear magnetic resonance apparatus is represented by the following formula f(t):

$$f(t)=A(1)\exp(-t/T_2(1))+A(2)\exp(-t/T_2(2))$$

(wherein $T_2(1)$ is a relaxation time of a component having a short relaxation time, $T_2(2)$ is a relaxation time of a component having a long relaxation time, A(1) is a signal intensity at t=0 of the component having a short relaxation time, and A(2) is a signal intensity at t=0 of the component having a long relaxation time), the amount of hydrogen represented by the following formula (II):

$$A(1)/w \quad (II)$$

(wherein w is a mass (g) of a measurement sample) is 50.0 to 250.0 (/g).

The above amount of hydrogen (the amount of hydrogen represented by the above formula (II)) is 50.0 to 250.0 (/g) to ensure good dispersibility in the kneading into rubber and a rubber composition having a low loss factor (low heat generation) at the same time, preferably 90.0 to 225.0 (/g) to ensure stable dispersibility and low heat generation at the same time, and more preferably 100.0 to 215.0 (/g) to ensure an optimum balance between the dispersibility and the low heat generation.

In the carbon black according to the present invention, when the above amount of hydrogen (the amount of hydrogen represented by the above formula (II)) falls within the above range, the carbon black can exert good dispersibility in the kneading into rubber and a rubber composition having a low loss factor (low heat generation) can be easily prepared.

On the other hand, when the above total number of active sites (the total number of active sites represented by the above formula (I)) falls within the above range, the carbon black according to the present invention can obtain moderate binding force (affinity) between the carbon black and a rubber component, and can easily achieve moderate hardness (processability) of the rubber composition upon use as a rubber component, as mentioned above.

Therefore, the carbon black according to the present invention in which each of the above total number of active sites (the total number of active sites represented by the above formula (I)) and the above amount of hydrogen (the amount of hydrogen represented by the above formula (II)) falls within a predetermined range has a low loss factor (low heat generation) and can easily exert low fuel consumption performance, and further has moderate binding force (affinity) with a rubber component and can easily exert excellent abrasion resistance, when used as a constituent component of a rubber composition.

In the present invention, the amount of hydrogen (the amount of hydrogen represented by the above formula (II)) can be calculated by the following method.

(1) After a carbon black serving as the measurement object is dried at 110° C. for 30 minutes using Minispec mq20 manufactured by Bruker BioSpin K.K. as a pulsed nuclear magnetic resonance apparatus, 0.2 g of which is charged in a glass sample tube and used as a measurement sample. The spin-spin relaxation times (transverse relaxation times) $T_2$ thereof are measured under the following measurement conditions to obtain a $T_2$ relaxation curve (free induction decay curve).

<Measurement Conditions>
Measured nucleus: $^1H$
Pulse mode: solid echo method (90°x–τ–90°y)
90° pulse width: 2.7 μs
Measurement time: 2 ms
Waiting time: 500 ms
Cumulative number: 52 times
Measurement temperature: 40° C.
Gain: 90

Since the mass of the carbon black is constant at 0.2 g and the apparatus function is also constant at (Gainn=90), the signal intensity of the obtained $T_2$ relaxation curve (free induction decay curve) increases and decreases in proportion to the $^1H$ concentration of the measurement object.

(2) The obtained free induction decay curve is fitted by a linear least squares method using a fitting software (TD-NMR-A for Windows 7) equipped with the above pulsed nuclear magnetic resonance apparatus (Minispec mq20 manufactured by Bruker BioSpin K.K.) to obtain an approximate curve represented by the following formula f(t):

$$f(t)=A(1)\exp(-t/T_2(1))+A(2)\exp(-t/T_2(2))$$

(wherein $T_2(1)$ is a relaxation time of a component having a short relaxation time, $T_2(2)$ is a relaxation time of a component having a long relaxation time, $A(1)$ is a signal intensity at t=0 of the component having a short relaxation time, and $A(2)$ is a signal intensity at t=0 of the component having a long relaxation time).

(3) The above signal intensity $A(1)$ is divided by the mass w (g) of the measurement sample.

FIG. 3 shows an example of a $T_2$ relaxation curve (free induction decay curve) obtained by the above method.

As shown in FIG. 3, assuming that the instant when the carbon black is excited by 90° pulse is t=0, it is found that the signal in which the magnetization (signal intensity) in the y-axis direction attenuates with time can be obtained.

FIG. 4 shows the fitting curves in the case where the $T_2$ relaxation curve (free induction decay curve) shown in FIG. 3 is fitted by a linear least squares method, by solid lines, and as shown in FIG. 4, the obtained $T_2$ relaxation curve (free induction decay curve) can be represented by the sum of two exponential functions by fitting.

Here, since the liquid and the solid can be distinguished from the difference in time constants, the signal intensity $A(1)$ at t=0 (in the excitation by 90° pulse) in the exponential function of a component having a short relaxation time can be specified as the hydrogen atoms (—COOH, —OH, —H on the surface, —H in carbon skeletons, etc.) on the carbon black surface. Similarly, the signal intensity $A(2)$ at t=0 (in the excitation by 90° pulse) in the exponential function of a component having a short relaxation time can be specified as the moisture adsorbed on the carbon black surface, polycyclic aromatic hydrocarbon compounds in liquid form, and the like.

By dividing the above signal intensity $A(1)$ (a.u.) by the mass w (0.2 g) of the carbon black subjected to the measurement, the amount of hydrogen "$A(1)/w$" per unit mass of the carbon black can be calculated.

According to the investigation by the present inventors, the amount of hydrogen represented by the above formula (II) ($A(1)/w$) has been found to exhibit high correlation with the amount of hydrogen obtained by thermal decomposition which is conventionally known as a method for measuring the amount of hydrogen on the carbon black surface, and therefore can be suitably used as an index indicating the amount of hydrogen on the carbon black surface.

The carbon black according to the present invention is preferably one in which the DBP (dibutylphthalate) absorption is 60 to 200 $cm^3/100$ g, more preferably 70 to 195 $cm^3/100$ g, and further preferably 80 to 190 $cm^3/100$ g.

The above DBP absorption is an index indicating the degree of structure development, that is, the degree of complexity of the aggregate structure.

When the DBP absorption is less than 60 ml/100 g, the dispersibility of the carbon black deteriorates when the carbon black is incorporated into the rubber composition, so that the reinforcing properties of the obtained rubber are likely to be reduced, and when the DBP absorption exceeds 200 ml/100 g, the processability of the obtained rubber when incorporated into the rubber composition may be reduced.

In the present application, the DBP absorption means a value measured by the method defined in JIS K6217-4 "Carbon black for rubber industry-Fundamental characteristics-Part 4: Determination of DBP absorption".

The carbon black according to the present invention can be suitably produced by the production method described below according to the present invention.

The present invention can provide a new carbon black which can exert superior abrasion resistance while suppressing heat generation when incorporated into a rubber composition such as a tire tread rubber composition.

Next, the method for producing the carbon black according to the present invention will be described.

The method for producing the carbon black according to the present invention is a method for producing the carbon black according to the present invention, comprising sequentially performing a primary reaction step of bringing a raw material oil having a ratio of the mass of carbon to the mass of hydrogen (mass of carbon/mass of hydrogen) of 10.0 to 20.0 into contact with a combustion gas to generate a primary reactant, and a secondary reaction step of reacting an additive oil having a ratio of the mass of carbon to the mass of hydrogen (mass of carbon/mass of hydrogen) of 5.0 or more and less than 10.0 in an amount of 0.20 to 1.00 times the mass of the raw material oil with the primary reactant.

In the method for producing the carbon black according to the present invention, the ratio of the mass of carbon to the mass of hydrogen that constitutes the raw material oil (mass of carbon/mass of hydrogen) is 10.0 to 20.0, preferably 10.0 to 18.0, and further preferably 11.0 to 17.0.

In the method for producing the carbon black according to the present invention, when the ratio of the mass of carbon to the mass of hydrogen that constitute the raw material oil (mass of carbon/mass of hydrogen) falls within the above range, the carbon black can be produced with a high yield while maintaining a stable reaction.

In the method for producing the carbon black according to the present invention, the ratio of the mass of carbon to the mass of hydrogen (mass of carbon/mass of hydrogen) means a value (mass ratio) calculated based on the mass of carbon and hydrogen measured in accordance with JIS M 8813.

In the method for producing the carbon black according to the present invention, examples of the raw material oil include one or more selected from the group consisting of aromatic hydrocarbons such as cyclohexane, benzene, toluene, xylene, naphthalene, and anthracene; coal hydrocarbons such as creosote oil and carboxylic acid oil; petroleum heavy oils such as ethylene bottom oil (ethylene heavy end oil) and FCC residual oil; acetylene unsaturated hydrocarbons; ethylene hydrocarbons; and aliphatic saturated hydrocarbons such as pentane and hexane.

In the present invention, the raw material oil may be a combination of two or more of the above hydrocarbons.

In the method for producing the carbon black according to the present invention, the primary reaction of bringing a raw material oil having a ratio of the mass of carbon to the mass of hydrogen (mass of carbon/mass of hydrogen) of 10.0 to 20.0 into contact with a combustion gas to generate a primary reactant.

The combustion gas is preferably a mixed combustion gas of an oxygen containing gas and a fuel. Examples of the above oxygen containing gas include gas composed of oxygen, air, or a mixture thereof, and examples of the fuel include hydrogen, carbon monoxide, natural gas, petroleum gas, FCC residual oil, petroleum liquid fuels such as heavy oil, and coal liquid fuels such as creosote oil.

In the method for producing the carbon black according to the present invention, when the air is used as the oxygen containing gas, the air feed is preferably 3.5 to 6.0 $Nm^3$ per 1 kg of the raw material oil feed, the air feed is more preferably 4.0 to 5.3 $Nm^3$ per 1 kg of the raw material oil feed, and the air feed is further preferably 4.2 to 5.3 $Nm^3$ per 1 kg of the raw material oil feed.

In the method for producing the carbon black according to the present invention, the raw material oil and the oxygen containing gas to be supplied in the primary reaction are preferably brought into contact such that the amount of oxygen in the oxygen containing gas can be 0.74 to 1.26 $Nm^3$ per 1 kg of the raw material oil feed, more preferably brought into contact such that the amount of oxygen in the oxygen containing gas can be 0.84 to 1.11 $Nm^3$ per 1 kg of the raw material oil feed, and further preferably brought into contact such that the amount of oxygen in the oxygen containing gas can be 0.88 to 1.11 $Nm^3$ per 1 kg of the raw material oil feed.

In the method for producing the carbon black according to the present invention, after a primary reaction step of bringing a raw material oil into contact with a combustion gas is performed to generate a primary reactant, a secondary reaction step of reacting an additive oil having a ratio of the mass of carbon to the mass of hydrogen of 5.0 or more and less than 10.0 in an amount of 0.20 to 1.00 times the mass of the raw material oil (reaction is performed such that the ratio represented by the mass of the additive oil/the mass of the raw material oil can be 0.20 to 1.00) with the obtained primary reactant is performed.

The secondary reaction carried out in the above secondary reaction step is a reaction causing an additive oil to act on the primary reactant to add a predetermined amount of hydrogen to a primary product. As used herein, causing an additive oil to act on the primary reactant described above has the same meaning as reacting an additive oil with the primary reactant.

In the method for producing the carbon black according to the present invention, the ratio of the mass of carbon to the mass of hydrogen that constitute the additive oil (mass of carbon/mass of hydrogen) is 5.0 or more and less than 10.0, preferably 5.5 to 9.5, and further preferably 6.0 to 9.0.

In the method for producing the carbon black according to the present invention, when the ratio of the mass of carbon to the mass of hydrogen that constitute the additive oil (mass of carbon/mass of hydrogen) falls within the above range, a carbon black having hydrogen functional groups on the surface can be easily prepared.

In the method for producing the carbon black according to the present invention, the ratio of the mass of carbon to the mass of hydrogen (mass of carbon/mass of hydrogen) means a value (mass ratio) calculated based on the mass of carbon and hydrogen measured in accordance with JIS M 8813.

The above additive oil is not particularly limited, as long as it is an oil containing a hydrogen atom, and is preferably a hydrocarbon oil. Examples of the hydrocarbon oil include one or more selected from the group consisting of aromatic hydrocarbons such as cyclohexane, benzene, toluene, xylene, naphthalene, and anthracene; acetylene unsaturated hydrocarbons; ethylene hydrocarbons; and aliphatic saturated hydrocarbons such as pentane and hexane.

In the method for producing the carbon black according to the present invention, the secondary reaction is carried out in such an amount that the amount of the additive oil to be added to the primary reactant can be 0.20 to 1.00 times the mass of the raw material oil, the secondary reaction is preferably carried out in such an amount the amount of the additive oil to be added to the primary reactant can be 0.22 to 0.90 times the mass of the raw material oil, and the secondary reaction is more preferably carried out in such an amount that the amount of the additive oil to be added to the primary reactant can be 0.23 to 0.80 times the mass of the raw material oil.

In the method for producing the carbon black according to the present invention, when the amount of the additive oil to be added is within the above range, a carbon black having hydrogen functional groups on the surface can be produced with a high yield while maintaining a stable reaction.

In the method for producing the carbon black according to the present invention, the additive oil is incorporated into and reacted with the primary reactant, so that a carbon black in which the desired amount of hydrogen atoms is bonded can be easily prepared while forming a predetermined number of edges serving as active sites on the surface.

In the method for producing the carbon black according to the present invention, the two steps, the primary reaction step and the secondary reaction step, are preferably carried out in a reactor.

The above reactor is preferably one equipped with a gas flow path along the flow of a gas, and the above gas flow path is preferably one in which a gas flows in substantially one direction from the upstream to the downstream side.

In addition, the above reactor is preferably one sequentially including a fuel combustion zone, a raw material introduction zone, and an additive oil introduction zone, from the upstream to the downstream direction in a gas flow path.

Examples of an embodiment of the method for producing the carbon black according to the present invention include an embodiment using a reactor sequentially including a fuel combustion zone, a raw material introduction zone, and an additive oil introduction zone, from the upstream to the downstream direction in a gas flow path, comprising:

introducing, mixing, and combusting an oxygen containing gas and a fuel in the fuel combustion zone to generate a high temperature combustion gas flow, and introducing the raw material oil into the raw material introduction zone while introducing the high temperature combustion gas flow to generate the primary reactant, as the primary reaction step, and then introducing the additive oil into the additive oil introduction zone, as the secondary reaction step.

FIG. 5 is a view schematically illustrating a large-diameter cylindrical reactor which is a preferred form of the above reactor.

Hereinafter, the method for producing the carbon black of the present invention is described below appropriately taking the reactor illustrated in FIG. 5 as an example.

The reactor illustrated in FIG. 5 sequentially includes a fuel combustion zone 3, a raw material introduction and primary reaction zone 5, an additive oil introduction zone 8, and a secondary reaction zone 9 which communicate with each other from the upstream to the downstream direction in the gas flow path formed inside the reactor.

That is, in the reactor illustrated in FIG. 5, the fuel combustion zone 3 is equipped with an oxygen containing gas introduction port 1 through which an oxygen containing gas such as air is introduced in the direction perpendicular to the axial direction of the reactor, and a combustion burner 2 which supplies fuel in the axial direction of the reactor. The raw material introduction and primary reaction zone 5 is equipped with raw material oil introduction nozzles 4 through which the raw material oil is supplied in the direction perpendicular to the axial direction of the reactor, and is provided to coaxially communicate with the fuel combustion zone 3. Further, the additive oil introduction zone 8 is equipped with additive oil introduction nozzles 6 through which an additive oil is supplied in the direction perpendicular to the axial direction of the reactor, and is provided to coaxially communicate with the raw material introduction and primary reaction zone 5. The secondary reaction zone 9 is provided to coaxially communicate with the additive oil introduction zone 8. In the reactor illustrated in FIG. 5, the reaction stopping zone is also provided to coaxially communicate with the secondary reaction zone 9, and in the reaction stopping zone, a cooling liquid introduction nozzle 7 through which a cooling liquid is sprayed in the direction perpendicular to the axial direction of the reactor is provided.

The reactor illustrated in FIG. 5 has an hourglass-like shape in which the reactor becomes narrower from the fuel combustion zone 3 toward the raw material introduction and primary reaction zone 5 and becomes wider from the raw material introduction and primary reaction zone 5 toward the additive oil introduction zone 8, but the reactor shape is not limited to such a shape and various shapes may be employed.

In the method for producing the carbon black of the present invention, an oxygen containing gas and a fuel are introduced into the fuel combustion zone 3 and mixed and combusted to generate a high temperature combustion gas flow.

Examples of the oxygen containing gas include gas formed of oxygen, air, or mixtures thereof, and examples of the fuel include hydrogen, carbon monoxide, natural gas, petroleum gas, FCC residual oil, petroleum liquid fuels such as heavy oil, and coal liquid fuels such as creosote oil.

Examples of the fuel that is the source for generating the combustion gas include the same fuels that can generate the combustion gas as mentioned above.

The amount of the oxygen containing gas supplied in the fuel combustion zone 3 is preferably 2,000 $Nm^3/h$ to 5,500 $Nm^3/h$, more preferably 2,500 $Nm^3/h$ to 5,000 $Nm^3/h$, and further preferably 3,000 $Nm^3/h$ to 4,500 $Nm^3/h$. The amount of the fuel supplied in the fuel combustion zone 3 is preferably 50 kg/h to 400 kg/h, more preferably 100 kg/h to 350 kg/h, and further preferably 150 kg/h to 300 kg/h.

In the fuel combustion zone 3, for example, the fuel is supplied while supplying the oxygen containing gas preheated to 400° C. to 600° C., so that both are mixed and combusted to generate a high temperature combustion gas flow.

In the method for producing the carbon black of the present invention, a raw material oil is introduced from the raw material oil introduction nozzles 4 to the raw material introduction and primary reaction zone 5, while introducing the above high temperature combustion gas flow into the raw material introduction and primary reaction zone 5.

Examples of the raw material oil supplied in the raw material introduction and primary reaction zone 5 include those mentioned above.

Examples of the above raw material oil introduction nozzle include one fluid nozzle.

The amount of the raw material oil introduced is not particularly limited, and is preferably 100 kg/hour to 2,000 kg/hour, more preferably 150 kg/hour to 1,500 kg/hour, and further preferably 200 kg/hour to 1,400 kg/hour.

In the method for producing the carbon black according to the present invention, a raw material oil is introduced into the above raw material introduction and primary reaction zone 5 to carry out the primary reaction, and then an additive oil is introduced into the additive oil introduction zone 8 to carry out the secondary reaction.

Examples of the additive oil include the same as those mentioned above.

The amount of the additive oil introduced in the additive oil introduction zone is preferably 50 to 1,500 kg/hour, more preferably 100 to 1,200 kg/hour, and further preferably 150 to 1,000 kg/hour.

When the amount of the additive oil introduced in the additive oil introduction zone falls within the above range, the amount of hydrogen on the carbon black surface to be obtained can be controlled to the desired range.

When the reactor illustrated in FIG. 5 is used in the method for producing the carbon black of the present invention, the primary reaction is carried out in the raw material introduction and primary reaction zone 5, and then an additive oil is introduced in the additive oil introduction zone 8 to carry out the secondary reaction in the additive oil introduction zone 8 and the secondary reaction zone 9, whereby the target carbon black can be easily prepared.

In the method for producing the carbon black of the present invention, a reactor that has no secondary reaction zone 9 may be used.

In the reactor illustrated in FIG. 5, when the above carbon black containing gas is introduced into the reaction stopping zone, a cooling liquid is sprayed.

Examples of the cooling liquid include water, and carbon black particles floating and suspended in the high temperature combustion gas are cooled by spraying the cooling liquid. The spraying of the cooling liquid can be carried out by, for example, spraying the cooling liquid from the cooling liquid introduction nozzle 7 illustrated in FIG. 5.

Then, the cooled carbon black particles are passed through a flue and the like and separated and collected by a collection system (separation and collection device) such as a cyclone and a bag filter, whereby the target carbon black can be recovered.

In the method for producing the carbon black of the present invention, the total number of active sites and the amount of hydrogen can be easily adjusted to the desired range by changing the type and the amount of the additive oil to be reacted with the primary reactant.

Examples of the carbon black obtained by the production method of the present invention include the same as those described in the description of the carbon black of the present invention.

According to the present invention, a method for conveniently producing a new carbon black which can exert superior abrasion resistance while suppressing heat generation when incorporated into a rubber composition such as a tire tread rubber composition.

Next, the rubber composition according to the present invention will be described.

The rubber composition according to the present invention contains 20 to 150 parts by mass of the carbon black according to the present invention with respect to 100 parts by mass of a rubber component.

In the rubber composition according to the present invention, examples of the rubber component include at least one selected from the group consisting of diene rubbers such as natural rubber, styrene-butadiene rubber, polybutadiene rubber, isoprene rubber, butyl rubber, chloroprene rubber, and acrylonitrile-butadiene copolymer rubber.

The rubber composition according to the present invention contains the carbon black according to the present invention, and the details of the carbon black contained in the rubber composition are as mentioned above.

Then, it is considered that, since having a predetermined total number of active sites and a predetermined amount of hydrogen, the carbon black according to the present invention has a predetermined amount of functional groups on the carbon black surface and can impart excellent low heat generation characteristics and abrasion resistance to the rubber composition.

In the rubber composition according to the present invention, the content of the carbon black according to the present invention is 20 to 150 parts by mass with respect to 100 parts by mass of the rubber component, preferably 25 to 145 parts by mass with respect to 100 parts by mass of the rubber component, and more preferably 30 to 140 parts by mass with respect to 100 parts by mass of the rubber component.

In the rubber composition according to the present invention, when the content of the carbon black according to the present invention falls within the above range, a rubber composition excellent in abrasion resistance, heat generation characteristics, and the like can be obtained.

The rubber composition according to the present invention preferably contains 60 to 100% by mass, preferably contains 60 to 99% by mass, more preferably contains 70 to 98% by mass, and further preferably contains 75 to 97% by mass of the rubber component and the carbon black according to the present invention, in total.

The rubber composition according to the present invention may contain usually used necessary components such as an inorganic reinforcing agent, a silane coupling agent, a vulcanizing agent, a vulcanizing accelerator, an antioxidant, a vulcanizing aid, a softener, and a plasticizer.

The rubber composition according to the present invention preferably contains 1 to 40% by mass, more preferably contain 2 to 30% by mass, and further preferably contain 3 to 25% by mass of these components, in total.

The rubber composition according to the present invention can be obtained by kneading the desired amount of the above carbon black and, if necessary, the desired amount of an inorganic reinforcing agent, a silane coupling agent, a vulcanizing agent, a vulcanizing accelerator, an antioxidant, a vulcanizing aid, a softener, a plasticizer, and the like with the rubber component. The above kneading can be carried out by using a kneading machine such as a known mixer and mill.

The rubber composition according to the present invention can be molded into a predetermined shape and then cured by appropriately heating at 130 to 180° C., whereby the desired rubber molded article can be obtained.

The rubber composition according to the present invention can improve heat generation characteristics and has improved reinforcing properties and heat generation properties with a good balance, and thus can be suitably used as the rubber composition for tire tread.

Next, the present invention will be described further in detail by way of examples, but they are merely illustrative and are not intended to limit the present invention.

EXAMPLE 1 TO EXAMPLE 13, COMPARATIVE EXAMPLE 1 TO COMPARATIVE EXAMPLE 7

Example 1

A carbon black was fabricated using a reactor having a substantially cylindrical shape as shown in FIG. 5.

The reactor illustrated in FIG. 5 sequentially including a fuel combustion zone 3, a raw material introduction and primary reaction zone 5, an additive oil introduction zone 8, a secondary reaction zone 9 and a reaction stopping zone which communicate with each other from the upstream to the downstream direction in the gas flow path formed inside the reactor.

In the reactor illustrated in FIG. 5, the fuel combustion zone 3 is equipped with an oxygen containing gas introduction port 1 through which an oxygen containing gas such as air is introduced in the direction perpendicular to the axial direction of the reactor, and a combustion burner 2 which supplies fuel in the axial direction of the reactor. The raw material introduction and primary reaction zone 5 is equipped with one fluid nozzles serving as raw material oil introduction nozzles 4 through which the raw material oil is supplied in the direction perpendicular to the axial direction of the reactor, and is provided to coaxially communicate with the fuel combustion zone 3.

The additive oil introduction zone 8 is equipped with one fluid nozzles serving as additive oil introduction nozzles 6 through which the additive oil is supplied in the direction perpendicular to the axial direction of the reactor, and is provided to coaxially communicate with the raw material introduction and primary reaction zone 5, and further, the secondary reaction zone 9 is provided to coaxially communicate with the additive oil introduction zone 8. In addition, the reaction stopping zone is equipped with a cooling liquid introduction nozzle 7 (water cooling quench) which supplies cooling water in the direction perpendicular to the axial direction of the reactor and is repositionable in the vertical direction of the drawing, and is provided to coaxially communicate with the secondary reaction zone 9.

As illustrated in FIG. 5, the reactor has an hourglass-like narrowed shape before and after the raw material introduction and primary reaction zone 5 in which the reactor becomes gradually narrower from the fuel combustion zone 3 toward the raw material introduction and primary reaction zone 5 and becomes wider from the raw material introduction and primary reaction zone 5 toward the additive oil introduction zone 8 in a tapered manner.

In the fuel combustion zone 3, 4000 Nm³/h of preheated air at 500° C. (oxygen content ratio: 21 volume %) was supplied from the oxygen containing gas introduction port 1 and 250 kg/h of a FCC residual oil (petroleum-derived residual oil) was injection-supplied from the combustion burner 2 as the fuel oil, and both were mixed and combusted to form a high temperature combustion gas flow which flows in the axial direction of the reactor.

While introducing the above high temperature combustion gas flow into the raw material introduction and primary reaction zone 5, 850 kg/h of an ethylene bottom oil having a carbon/hydrogen mass ratio of 12.0 was supplied as the raw material oil from one fluid nozzles serving as the raw material oil introduction nozzles 4, and then, 210 kg/h of cyclohexane having a carbon/hydrogen mass ratio of 6.0 was supplied from the additive oil introduction nozzles 6 in the additive oil introduction zone, followed by sequentially reacting to generate a carbon black containing gas.

Then, the carbon black containing gas generated in the additive oil introduction zone 8 through the raw material introduction and primary reaction zone 5 was introduced into the secondary reaction zone 9 and further allowed to sufficiently react with each other, and then introduced into the reaction stopping zone, and cooling water was sprayed from the cooling liquid introduction nozzle 7. The cooled carbon black particles were passed through the flue and the like, and collected by a separation and collection device not being shown, whereby the target carbon black was recovered.

The type and the carbon/hydrogen mass ratio of the raw material oil and the additive oil used, and the amount of the additive oil used with respect to the raw material oil in the above reaction are shown in Table 1, and the air feed, the fuel feed, the raw material oil feed, and the additive oil feed are shown in Table 2.

In addition, $\Delta D$, the nitrogen adsorption specific surface area $N_2SA$ (m²/g), the total number of active sites ($\Delta D \times N_2SA$), and the amount of hydrogen ($A(1)/w$) of the obtained carbon black are shown in Table 3.

Example 2 to Example 13, Comparative Example 1 to Comparative Example 7

Each carbon black was prepared in the same manner as in Example 1, except that the reaction conditions in Example 1 were changed as described in Table 1 and Table 2.

$\Delta D$, the nitrogen adsorption specific surface area $N_2SA$ (m²/g), the total number of active sites ($\Delta D \times N_2SA$), and the amount of hydrogen ($A(1)/w$) of the obtained carbon black are described in Table 3.

TABLE 1

| | Raw material oil | | | Additive oil | | | Amount of additive oil based on raw material oil (times the mass) |
|---|---|---|---|---|---|---|---|
| | Blending ratio (% by mass) | | | Blending ratio (% by mass) | | | |
| | Ethylene bottom oil | Cyclohexane | Carbon/hydrogen (mass ratio) | Ethylene bottom oil | Cyclohexane | Carbon/hydrogen (mass ratio) | |
| Example 1 | 100 | 0 | 12.0 | 0 | 100 | 6.0 | 0.25 |
| Example 2 | 100 | 0 | 12.0 | 0 | 100 | 6.0 | 0.28 |
| Example 3 | 100 | 0 | 12.0 | 0 | 100 | 6.0 | 0.22 |
| Example 4 | 76 | 24 | 10.6 | 0 | 100 | 6.0 | 0.25 |
| Example 5 | 73 | 27 | 10.4 | 0 | 100 | 6.0 | 0.28 |
| Example 6 | 78 | 22 | 10.7 | 0 | 100 | 6.0 | 0.23 |
| Example 7 | 100 | 0 | 12.0 | 40 | 60 | 8.4 | 0.41 |
| Example 8 | 100 | 0 | 12.0 | 40 | 60 | 8.4 | 0.37 |
| Example 9 | 100 | 0 | 12.0 | 40 | 60 | 8.4 | 0.35 |
| Example 10 | 71 | 29 | 10.2 | 50 | 50 | 9.0 | 0.71 |
| Example 11 | 85 | 15 | 11.1 | 50 | 50 | 9.0 | 0.60 |
| Example 12 | 71 | 29 | 10.2 | 41 | 59 | 8.5 | 0.60 |
| Example 13 | 85 | 15 | 11.1 | 41 | 59 | 8.5 | 0.51 |
| Comparative Example 1 | 100 | 0 | 12.0 | 0 | 0 | — | — |
| Comparative Example 2 | 100 | 0 | 12.0 | 0 | 0 | — | — |
| Comparative Example 3 | 100 | 0 | 12.0 | 76 | 24 | 10.6 | 0.25 |
| Comparative Example 4 | 100 | 0 | 12.0 | 76 | 24 | 10.6 | 0.28 |
| Comparative Example 5 | 100 | 0 | 12.0 | 0 | 100 | 6.0 | 0.18 |
| Comparative Example 6 | 53 | 47 | 9.2 | 0 | 100 | 6.0 | 0.25 |
| Comparative Example 7 | 53 | 47 | 9.2 | 0 | 0 | — | — |

TABLE 2

|  | Air feed (Nm³/h) | Fuel feed (kg/h) | Raw material oil feed (kg/h) | Additive oil feed (kg/h) |
|---|---|---|---|---|
| Example 1 | 4000 | 250 | 850 | 210 |
| Example 2 | 4000 | 250 | 750 | 210 |
| Example 3 | 4000 | 250 | 950 | 210 |
| Example 4 | 4000 | 250 | 850 | 210 |
| Example 5 | 4000 | 300 | 750 | 210 |
| Example 6 | 4000 | 300 | 900 | 210 |
| Example 7 | 4000 | 300 | 850 | 350 |
| Example 8 | 4000 | 250 | 950 | 350 |
| Example 9 | 4000 | 250 | 1000 | 350 |
| Example 10 | 4000 | 300 | 850 | 600 |
| Example 11 | 4000 | 300 | 1000 | 600 |
| Example 12 | 4000 | 300 | 850 | 510 |
| Example 13 | 4000 | 300 | 1000 | 510 |
| Comparative Example 1 | 4000 | 250 | 1000 | 0 |
| Comparative Example 2 | 4000 | 250 | 750 | 0 |
| Comparative Example 3 | 4000 | 250 | 850 | 210 |
| Comparative Example 4 | 4000 | 250 | 750 | 210 |
| Comparative Example 5 | 4000 | 300 | 850 | 150 |
| Comparative Example 6 | 4000 | 250 | 850 | 210 |
| Comparative Example 7 | 4000 | 300 | 850 | 0 |

TABLE 3

|  | ΔD (cm⁻¹) | N₂SA (m²/g) | Total number of active sites (cm⁻¹·m²/g) | Amount of hydrogen (/g) |
|---|---|---|---|---|
| Example 1 | 243 | 155 | $3.77 \times 10^4$ | 81.5 |
| Example 2 | 230 | 333 | $7.66 \times 10^4$ | 88.5 |
| Example 3 | 250 | 152 | $3.79 \times 10^4$ | 167.0 |
| Example 4 | 249 | 163 | $4.05 \times 10^4$ | 94.0 |
| Example 5 | 227 | 289 | $6.56 \times 10^4$ | 93.0 |
| Example 6 | 262 | 155 | $4.07 \times 10^4$ | 128.5 |
| Example 7 | 243 | 247 | $6.01 \times 10^4$ | 107.0 |
| Example 8 | 227 | 237 | $5.38 \times 10^4$ | 246.5 |
| Example 9 | 259 | 140 | $3.63 \times 10^4$ | 180.0 |
| Example 10 | 224 | 358 | $8.02 \times 10^4$ | 198.0 |
| Example 11 | 262 | 173 | $4.54 \times 10^4$ | 224.0 |
| Example 12 | 240 | 296 | $7.11 \times 10^4$ | 176.0 |
| Example 13 | 262 | 172 | $4.51 \times 10^4$ | 212.5 |
| Comparative Example 1 | 208 | 157 | $3.26 \times 10^4$ | 61.5 |
| Comparative Example 2 | 214 | 202 | $4.33 \times 10^4$ | 31.5 |
| Comparative Example 3 | 221 | 271 | $5.98 \times 10^4$ | 46.0 |
| Comparative Example 4 | 214 | 321 | $6.89 \times 10^4$ | 33.5 |
| Comparative Example 5 | 237 | 145 | $3.43 \times 10^4$ | 119.0 |
| Comparative Example 6 | 266 | 127 | $3.38 \times 10^4$ | 159.0 |
| Comparative Example 7 | 237 | 138 | $3.27 \times 10^4$ | 235.5 |

(Production Example of Rubber Composition)

As shown in Table 4, 100 parts by mass of natural rubber (RSS #1) which is the rubber component, 45 parts by mass of each carbon black obtained in the above Examples and Comparative Examples, 3 parts by mass of stearic acid, 1 part by mass of an oxidant (ANTAGE 6C manufactured by Kawaguchi Chemical Industry Co., LTD.), and 4 parts by mass of zinc white were kneaded with a sealed type mixer (MIXTRON BB-2 manufactured by Kobe Steel, Ltd.), and then, the obtained kneaded product was kneaded with 0.5 parts by mass of a vulcanizing accelerator (ACCEL NS manufactured by Kawaguchi Chemical Industry Co., LTD.) and 1.5 parts by mass of sulfur were kneaded with an open roll, whereby each rubber composition having composition shown in Table 4 was obtained.

TABLE 4

| Component compounded | Amount compounded (parts by mass) |
|---|---|
| Natural rubber (RSS #1) | 100 |
| Carbon black | 45 |
| Stearic acid | 3 |
| Antioxidant | 1 |
| Zinc white | 4 |
| Vulcanizing accelerator | 0.5 |
| Sulfur | 1.5 |

Then, each rubber composition obtained was subjected to vulcanization under temperature conditions of 145° C. for 45 minutes to form a vulcanized rubber.

Using the obtained vulcanized rubber, the abrasion loss and the loss factor (tan δ) were measured by the following method. The results are shown in Table 5.

In Table 5, the results of the abrasion loss and loss factor (tan δ) are shown for each Example and Comparative Example in which each carbon black used was obtained.

<Abrasion Loss>

The abrasion loss was measured using a Lambourn abrasion tester (mechanical slip mechanism, AB-1152 manufactured by Ueshima Seisakusho Co., Ltd.), in accordance with the method defined in JIS K6264 "Rubber, vulcanized or thermoplastic—Determination of abrasion resistance—" under the following measurement conditions.

Specimen: thickness: 10 mm, outer diameter: 48 mm
Abrasive paper: grain size A80
Slip ratio: 10%
Specimen surface speed: 72 m/min
Test load: 3 kg A smaller value of the abrasion loss indicates more excellent abrasion resistance.

<Loss Factor (tan δ)>

Using a specimen having a thickness of 2 mm, a length of 40 mm, and a width of 4 mm cut from each vulcanized rubber obtained, the loss factor (tan δ) was measured using a viscoelastic spectrometer (VR-7110 manufactured by Ueshima Seisakusho Co., Ltd.) under the measurement conditions of a frequency of 50 Hz, a dynamic strain rate of 1.26%, and a measurement temperature of 60° C.

A smaller value of the loss factor (tan δ) indicates lower heat generation.

FIG. 6 shows the loss factor (tan δ) for the abrasion loss of each vulcanized rubber fabricated using each carbon black obtained in Example 1 to Example 13 and Comparative Example 1 to Comparative Example 7.

TABLE 5

|  | Abrasion loss (g/10 min) | tan δ (MPa) |
|---|---|---|
| Example 1 | 0.140 | 0.194 |
| Example 2 | 0.163 | 0.181 |
| Example 3 | 0.161 | 0.151 |
| Example 4 | 0.161 | 0.160 |
| Example 5 | 0.133 | 0.186 |
| Example 6 | 0.196 | 0.163 |
| Example 7 | 0.133 | 0.198 |
| Example 8 | 0.181 | 0.177 |
| Example 9 | 0.210 | 0.156 |
| Example 10 | 0.115 | 0.188 |
| Example 11 | 0.134 | 0.155 |
| Example 12 | 0.113 | 0.198 |
| Example 13 | 0.134 | 0.160 |
| Comparative Example 1 | 0.237 | 0.179 |
| Comparative Example 2 | 0.196 | 0.203 |

TABLE 5-continued

|  | Abrasion loss (g/10 min) | tan δ (MPa) |
|---|---|---|
| Comparative Example 3 | 0.134 | 0.223 |
| Comparative Example 4 | 0.148 | 0.230 |
| Comparative Example 5 | 0.221 | 0.195 |
| Comparative Example 6 | 0.226 | 0.197 |
| Comparative Example 7 | 0.196 | 0.198 |

It was found from the results of Table 3, Table 5, and FIG. 6 that, since using a carbon black in which each of the total number of active sites represented by ΔD×N$_2$SA and the amount of hydrogen represented by A(1)/w falls within the predetermined range, each vulcanized rubber fabricated using each carbon black obtained in Example 1 to Example 13 has a loss factor tan δ and suppressed heat generation and further has a low abrasion loss and can exert abrasion resistance (can achieve both low heat generation and abrasion resistance).

In contrast, it was found from the results of Table 3, Table 5, and FIG. 6 that, since using a carbon black in which the total number of active sites represented by ΔD×N$_2$SA and the amount of hydrogen represented by A(1)/w are out of the predetermined range, each vulcanized rubber fabricated using each carbon black for comparison obtained in Comparative Example 1 to Comparative Example 7 has a high loss factor tan δ, a high heat generation amount, a large abrasion loss, and poor abrasion resistance (cannot achieve both low heat generation and abrasion resistance) when each carbon black is incorporated into the rubber composition.

INDUSTRIAL APPLICABILITY

The present invention can provide a new carbon black which can exert superior abrasion resistance while suppressing heat generation when incorporated into a rubber composition such as a tire tread rubber composition, and further provide a method for producing the carbon black, and a rubber composition.

REFERENCE SIGNS LIST

1 Oxygen containing gas introduction port
2 Combustion burner
3 Fuel combustion zone
4 Raw material oil introduction nozzle
5 Raw material introduction and primary reaction zone
6 Additive oil introduction nozzle
7 Cooling liquid introduction nozzle
8 Additive oil introduction zone
9 Secondary reaction zone

The invention claimed is:

1. A carbon black, wherein
a total number of active sites represented by a product of a full width at half maximum of a Raman scattering peak appearing in a range of 1340 to 1360 cm$^{-1}$ when an excitation wavelength is 532 nm and a specific surface area when nitrogen gas is adsorbed is $3.60 \times 10^4$ to $8.20 \times 10^4$ (cm$^{-1}$·m$^2$/g),
a nitrogen adsorption specific surface area (N$_2$SA) is 110 to 410 m$^2$/g,
a full width at half maximum of a Raman scattering peak AD is 200 to 330 cm$^{-1}$, and
when a nuclear magnetic resonance signal of a spin-spin relaxation process observed by a solid echo method is represented by a sum of a first signal and a second signal having a time constant larger than that of the first signal, an amount of hydrogen represented by a signal intensity per unit mass at time 0 of the first signal is 50.0 to 250.0 (/g).

2. A method for producing the carbon black according to claim 1, comprising sequentially performing:
a primary reaction step of bringing a raw material oil having a ratio of the mass of carbon to the mass of hydrogen of 10.0 to 20.0 into contact with a combustion gas to generate a primary reactant, and
a secondary reaction step of reacting an additive oil having a ratio of the mass of carbon to the mass of hydrogen of 5.0 or more and less than 10.0 in an amount of 0.20 to 1.00 times the mass of the raw material oil with the primary reactant.

3. The method for producing the carbon black according to claim 2 using a reactor sequentially including a fuel combustion zone, a raw material introduction zone, and an additive oil introduction zone, from the upstream to the downstream direction in a gas flow path,
the method comprising:
introducing, mixing, and combusting an oxygen containing gas and a fuel in the fuel combustion zone to generate a high temperature combustion gas flow, and introducing the raw material oil into the raw material introduction zone while introducing the high temperature combustion gas flow to generate the primary reactant, as the primary reaction step, and then
introducing the additive oil into the additive oil introduction zone, as the secondary reaction step.

4. A rubber composition comprising 20 to 150 parts by mass of the carbon black according to claim 1 with respect to 100 parts by mass of a rubber component.

* * * * *